US009975235B2

(12) United States Patent
Notaras et al.

(10) Patent No.: US 9,975,235 B2
(45) Date of Patent: May 22, 2018

(54) PORTABLE MOTORISED BLOWER WITH ANTI-VIBRATION HANDLE SYSTEM AND REDUCED OPERATING WEIGHT

(71) Applicants: John Arthur Notaras, Sydney (AU); Angelo Lambrinos Notaras, Sydney (AU)

(72) Inventors: John Arthur Notaras, Sydney (AU); Angelo Lambrinos Notaras, Sydney (AU)

(*) Notice: Subject to any disclaimer, the term of this patent is extended or adjusted under 35 U.S.C. 154(b) by 266 days.

(21) Appl. No.: 14/782,383

(22) PCT Filed: Apr. 2, 2014

(86) PCT No.: PCT/AU2014/050009
§ 371 (c)(1),
(2) Date: Oct. 5, 2015

(87) PCT Pub. No.: WO2014/161048
PCT Pub. Date: Oct. 9, 2014

(65) Prior Publication Data
US 2016/0059402 A1    Mar. 3, 2016

(30) Foreign Application Priority Data

Apr. 5, 2013    (AU) .............................. 2013901171

(51) Int. Cl.
*B25F 5/00*     (2006.01)
*E01H 1/08*     (2006.01)
(Continued)

(52) U.S. Cl.
CPC .............. *B25F 5/006* (2013.01); *A01G 20/43* (2018.02); *B25F 5/02* (2013.01); *E01H 1/0809* (2013.01); *F16F 15/067* (2013.01)

(58) Field of Classification Search
CPC ....... B25J 18/06; B25J 9/0075; B25J 17/0266
See application file for complete search history.

(56) References Cited

U.S. PATENT DOCUMENTS 3,652,074 A * 3/1972 Frederickson .......... B27B 17/00
                                                  173/162.1
3,972,119 A * 8/1976 Bailey ................. B27B 17/0033
                                                  173/162.1
(Continued)

FOREIGN PATENT DOCUMENTS

GB            2423276 A      8/2006

OTHER PUBLICATIONS

International Search Report dated May 14, 2014 in International Patent Application No. PCT/AU2014/050009.
(Continued)

*Primary Examiner* — David M Fenstermacher
(74) *Attorney, Agent, or Firm* — Venable LLP; Steven J. Schwarz

(57) ABSTRACT

A handle (16) is disclosed having an elongate portion (21) and a outrigger portion (26). The elongate portion has a longitudinal axis (24) which extends between two ends (22, 23) and is shaped to be grasped by an operator in use. The outrigger portion extends away from one end of the elongate portion and has a free end (27). The three ends (22, 23, 27) are each connected to the blower or other appliance by a corresponding anti-vibration coil spring (32, 33, 37) through which a corresponding bolt (42, 43, 47) passes. The outrigger portion prevents the elongate portion rotating about its longitudinal axis. In addition, the elongate portion can be grasped by a hand of an operator in either one of two positions. A first position substantially above the blower's center of gravity provides a balanced grip while the blower is not operating. When the blower is operating, air is expelled from a tube having an exit generally coplanar with,
(Continued)

Figure 1:
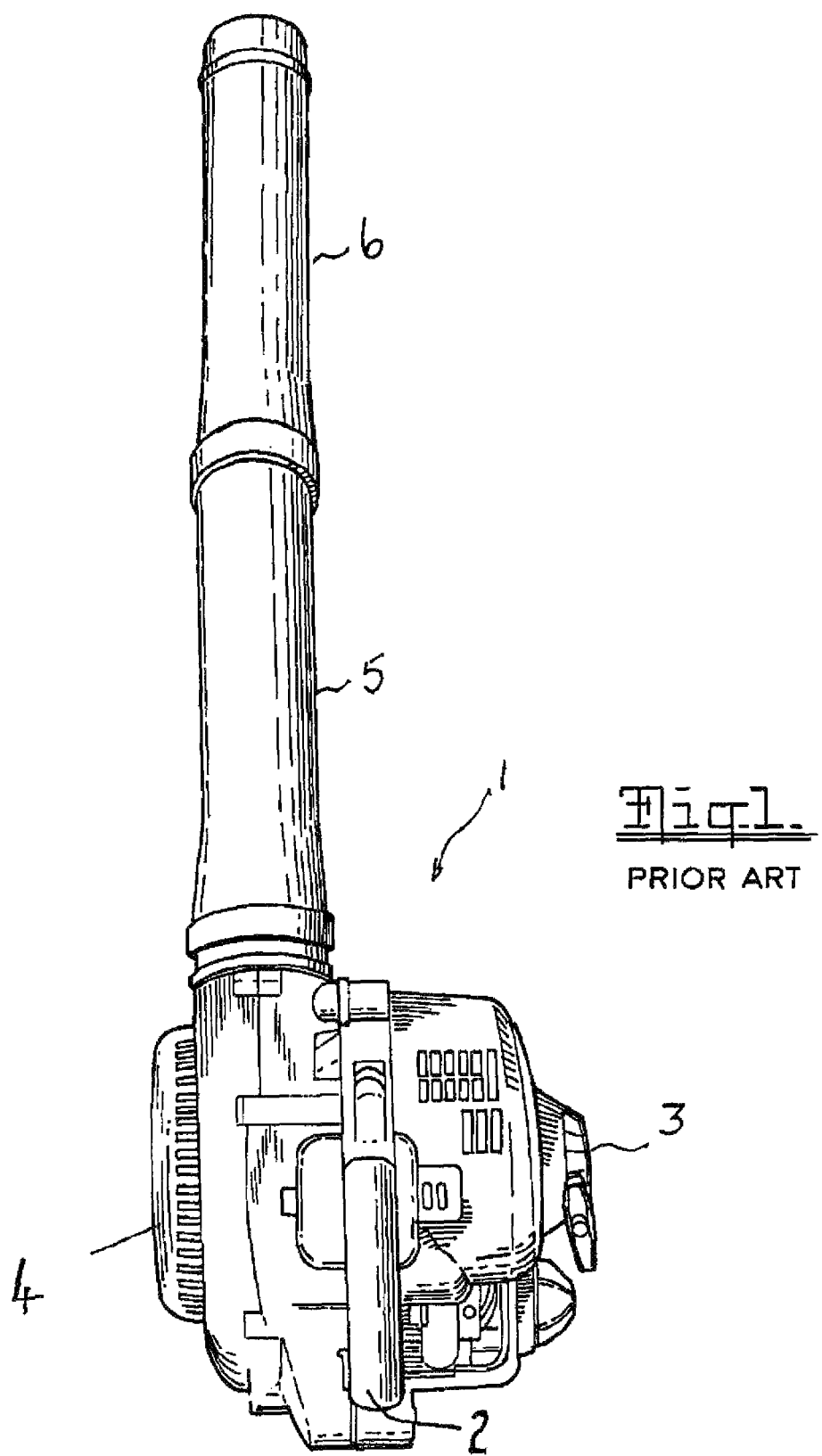

or aligned with, the handle. In those circumstances, the handle is grasped at a second location spaced from the first location in a direction extending away from the tube. The blower operates in a stable equilibrium condition and can be weighed by a spring balance having a hook located at the second handle location. A weight reduction of approximately 1 kg reduces operator fatigue. The handle (16) at the second location (66) is tilted relative to the tube (14) and its outlet (15) so that when the blower is used on level ground the air exit tube points downwardly at approximately 45° and the second location of the handle is substantially level. The blower has a two-part body one part (51) of which has a grille for an air intake, and the other (52) of which has the internal combustion engine mounted thereon. Fasteners (42, 43, 47) extend from the handle through the other part and into blind holes in the one part. Thus the fasteners are not visible when the blower is viewed from the air intake side.

7 Claims, 16 Drawing Sheets

(51) Int. Cl.
*B25F 5/02* (2006.01)
*F16F 15/067* (2006.01)

(56) References Cited

U.S. PATENT DOCUMENTS

| | | | |
|---|---|---|---|
| 4,325,163 A * | 4/1982 | Mattson | A47L 5/14 15/330 |
| 4,792,286 A | 12/1988 | Gassen | |
| 4,819,742 A | 4/1989 | Driggers | |
| 5,031,273 A * | 7/1991 | Yamaguchi | B25D 17/043 16/431 |
| 5,361,500 A | 11/1994 | Naslund et al. | |
| 5,697,456 A * | 12/1997 | Radle | B25D 17/043 173/162.2 |
| 6,305,909 B1 | 10/2001 | Jankowski et al. | |
| 6,799,642 B2 * | 10/2004 | Wolf | B25F 5/006 173/162.1 |
| 7,219,433 B2 * | 5/2007 | Gorenflo | B27B 17/0033 173/162.2 |
| 7,270,320 B2 * | 9/2007 | Menzel | B27B 17/0033 173/162.2 |
| 7,357,380 B2 * | 4/2008 | Menzel | B23D 47/005 188/378 |
| 7,412,959 B2 * | 8/2008 | Wolf | B27B 17/0033 123/198 E |
| 7,568,682 B2 * | 8/2009 | Seelmann | E01F 8/0023 267/170 |
| 8,225,514 B2 * | 7/2012 | Guip | B27B 17/0033 173/162.2 |
| 9,216,517 B2 * | 12/2015 | Kurzenberger | B27B 17/0033 |
| 9,561,599 B2 * | 2/2017 | Kurzenberger | B25F 5/006 |
| 9,623,547 B2 * | 4/2017 | Kurzenberger | B25F 5/006 |
| 2006/0179602 A1 | 8/2006 | Schliemann et al. | |
| 2011/0226501 A1 | 9/2011 | Wolf et al. | |
| 2014/0154106 A1 | 6/2014 | Notaras et al. | |

OTHER PUBLICATIONS

Written Opinion dated May 14, 2014 in International Patent Application No. PCT/AU2014/050009.

* cited by examiner

PORTABLE MOTORISED BLOWER WITH ANTI-VIBRATION HANDLE SYSTEM AND REDUCED OPERATING WEIGHT

This application is a U.S. National Stage of International Patent Application No. PCT/AU2014/050009, filed Apr. 2, 2014, which in turn claims priority to Australian Patent Application No. 2013901171, filed Apr. 5, 2013, priority of which is also claimed herein. The entire content of the foregoing applications is incorporated herein by reference in its entirety.

FIELD OF THE INVENTION

The present invention relates to hand held portable appliances such as motorised blowers which have a motor or engine which induces vibration and which, in use, are held by a single hand of the operator. Such blowers have a fan axis of rotation which is substantially perpendicular to the plane in which the air is expelled.

BACKGROUND OF THE INVENTION

It has long been known to provide such appliances with anti-vibration handles in which the handle is connected to the body of the appliance by means of coil spring connections. U.S. Pat. Nos. 4,819,742 and 5,361,500 and US Application No 2011/0226501 are indicative of this art as applied to chain saws. However, chain saws are operated two handed and thus represent a different class of handle.

Where the anti-vibration handle is intended to be grasped by one hand, the handle is generally cylindrical having a longitudinal axis which extends between two ends. Each end is connected to the body of the appliance by means of a corresponding spring. As a consequence, the handle is able to rotate in either direction through a small arc about its longitudinal axis as a result of the flexing of the springs. Particularly where the appliance produces reaction forces in its operation, this can result in undesirable, and unwanted, movement between the handle of the appliance and the body of the appliance. The consequence is that the operator does not have full control of the appliance and injuries or other damage may result.

Furthermore, many prior art blowers are awkward to operate. In particular, in those prior art blowers where the axis of the air outlet tube is not aligned with the axis of the handle, in use a torque is generated by the air exiting from the outlet tube with tends to rotate the blower about a vertical axis. This torque must be resisted by the wrist of the operator and this requires sustained muscular effort over time.

In addition, even if the axis of the air outlet tube is aligned with the handle of the blower, the outlet tube of the blower must be directed more downwardly in use than in its normal carrying position. As a consequence, the wrist of the operator must be cocked downwardly so as to place the hand in the correct angle to direct the blast of air towards the ground, and in this way blow leaf litter and other debris in the desired direction. Furthermore, the blast of air must normally be directed from left to right and back again in a swinging arcuate movement. Each of these requirements increases the fatigue of the operator.

GENESIS OF THE INVENTION

The genesis of the present invention is a desire to provide an arrangement in which some, or all, of the above defects are overcome, or at least ameliorated.

SUMMARY OF THE INVENTION

In accordance with a first aspect of the present invention there is disclosed a method of operating a portable motorised blower in a stabilised equilibrium condition, said blower having a motor, a fan driven by the motor, an elongate air exit tube having an exit opening through which air from said fan is expelled, and a handle having a portion able to be grasped by a single hand of an operator, said portion having a longitudinal axis, said method comprising the steps of:
aligning the tube exit opening with the longitudinal axis of said handle, and,
tilting said handle portion relative to said tube such that in use on level ground said air exit tube points downwardly at approximately 45° and the handle portion is substantially level.

In accordance with a second aspect of the invention there is disclosed a method of operating a portable motorised blower in a stabilised equilibrium condition, said blower having a centre of gravity and a motor, a fan driven by the motor, an elongate air exit tube having an exit opening through which air from said fan is expelled, and an elongate handle having a handle longitudinal axis, said method comprising the steps of:
aligning the tube exit opening with the longitudinal axis of said handle, extending said handle in a direction away from said tube such that said handle has two locations at each of which said handle can be grasped by an operator's single hand, said first location being substantially above said centre of gravity, and said second location being spaced from said first location in a direction away from said tube, whereby with said single hand grasping said handle at said second location the weight of said blower experienced by the operator is reduced by a thrust created by air being expelled from the tube exit opening.

In accordance with a third aspect of the present invention there is disclosed a portable motorised blower having a centre of gravity, a motor, a fan driven by the motor, an elongate air exit tube having a tube exit opening through which air from said fan is expelled, and an elongate handle having a longitudinal axis; wherein the tube exit opening and the longitudinal axis of said handle are aligned, said handle is extended in a direction away from said tube to create two locations at each of which said handle can be grasped by an operator's single hand, said first location being substantially above said centre of gravity, and said second location being spaced from said first location in a direction away from said tube whereby with said single hand grasping said handle at said second location, the weight of the blower experienced by the operator is reduced by a thrust created by air being expelled from the tube exit opening.

In accordance with a still further aspect of the present invention there is disclosed an anti-vibration handle for a hand-held appliance having a motor or engine which induces vibration, and a body to which said the motor or engine is mounted; said handle comprising a first elongate portion and a second outrigger portion; said first elongate portion having two ends, having a generally longitudinal axis extending between said two ends, being shaped to be grasped by one hand of an operator between said ends; and said second outrigger portion being located adjacent one of said ends, extending generally perpendicularly to said longitudinal axis from said first elongate portion, terminating in a free end, and being firmly connected with said first elongate portion; said two ends and said free end each having a corresponding one of three coil springs by means of which said ends can be attached to the body of said appliance, and said outrigger portion being closely spaced from said body so as to not function as a graspable handle portion, whereby said outrigger portion restrains said first portion from rotating about its longitudinal axis due to flexing of the two springs connected to said two ends.

Preferably, the body includes a housing fabricated as two components and each said spring has a fastener with a captive head and which passes through one of said housing components, into the other of said housing components, and clamps said housing components together.

In accordance with yet another aspect of the present invention there is disclosed a blower having a fan driven by an internal combustion engine, at least one tube forming an air exit for said fan, and a generally L-shaped handle comprising a substantially U or C-shaped handle and an outrigger to said U or C-shaped handle, wherein said blower has an exterior body formed from two parts, one of said parts having a grille forming an air intake for said fan and a plurality of blind holes, the other of said parts having said internal combustion engine mounted thereon and having a plurality of through holes, and said L-shaped handle having a plurality of fasteners which each pass through a corresponding one of said through holes and into a corresponding one of said blind holes to clamp said other part between said one part and said L-shaped handle.

BRIEF DESCRIPTION OF THE INVENTION

Figure 2:
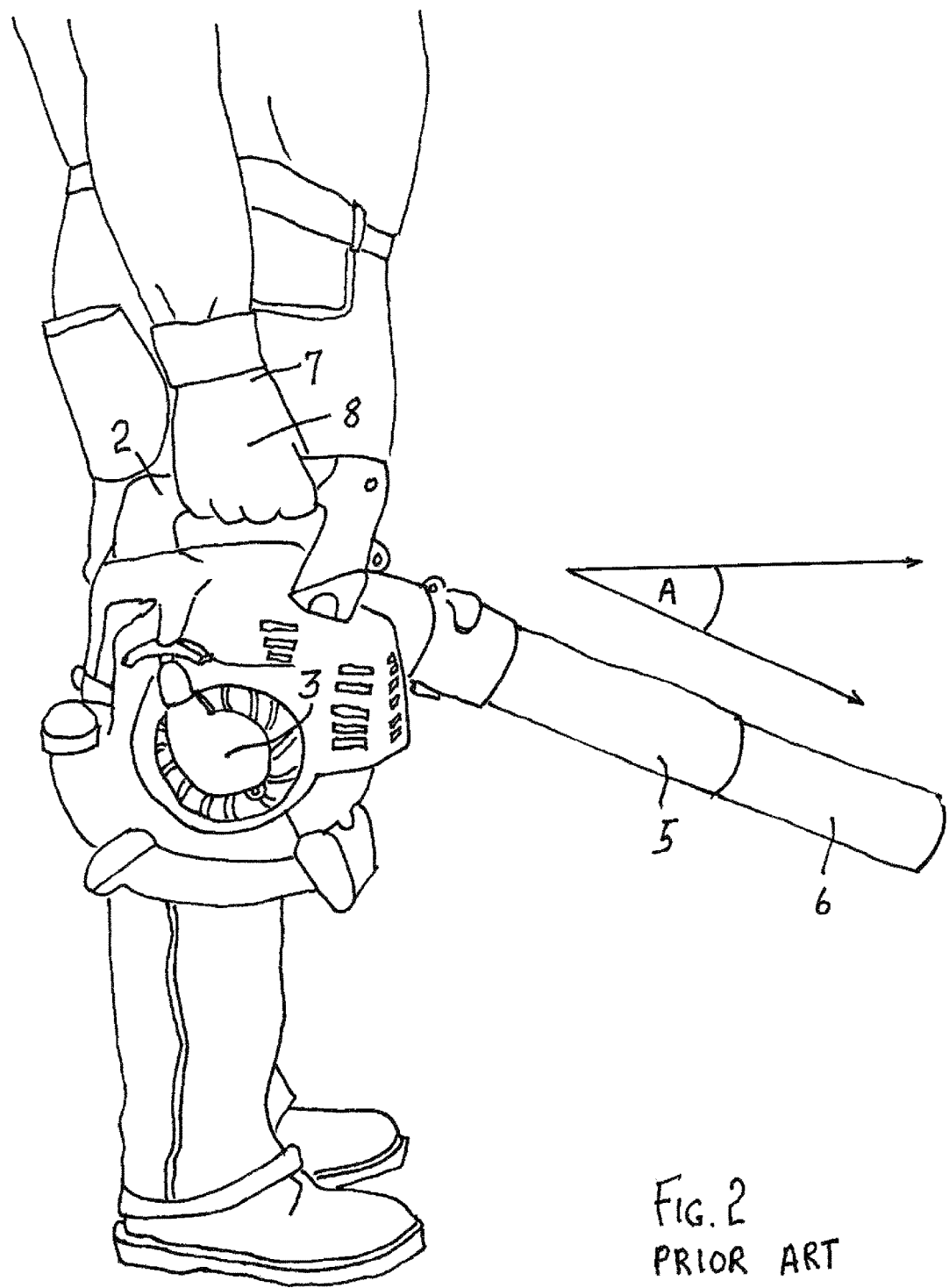
Figure 3:
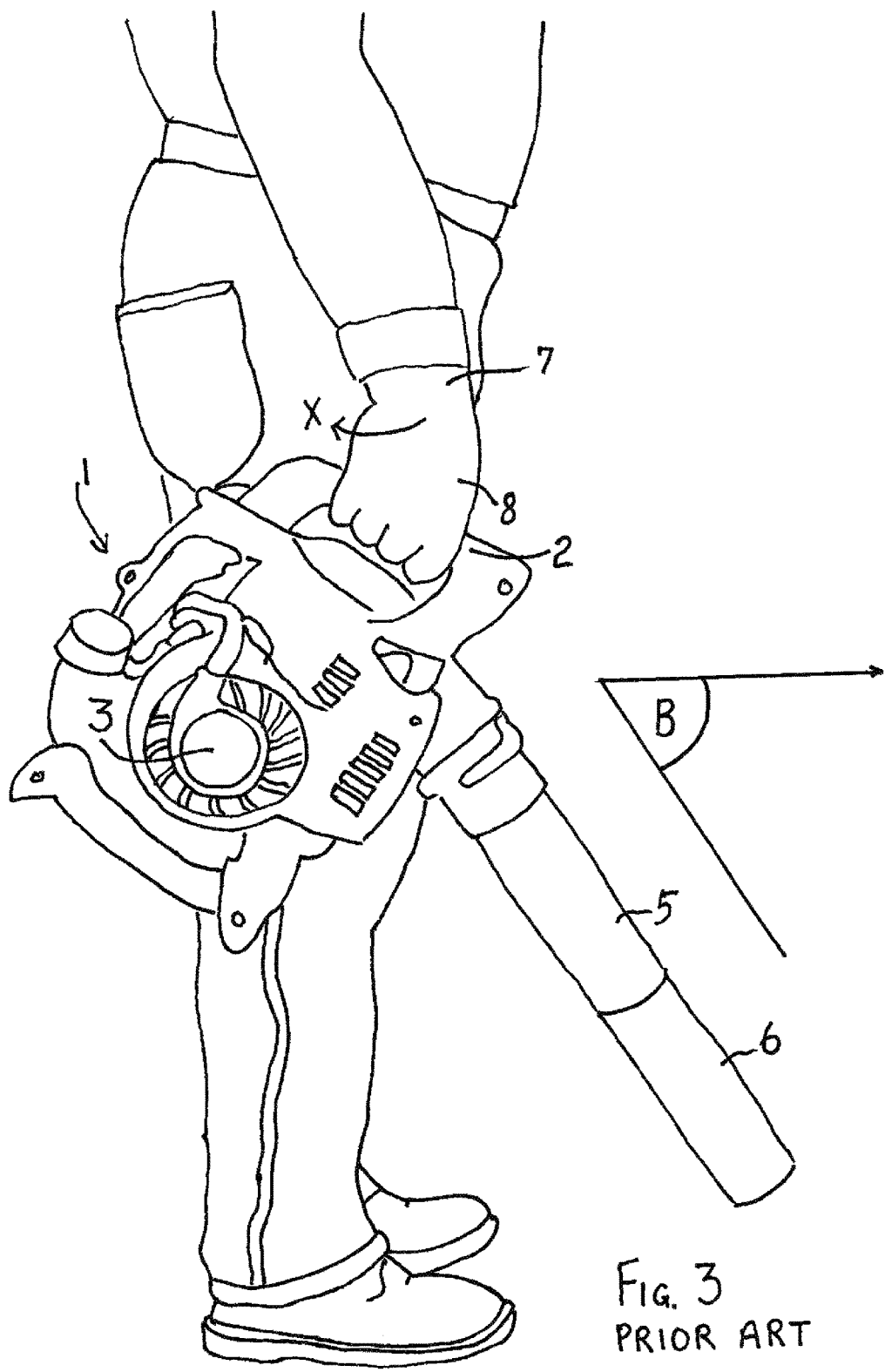
Figure 4:
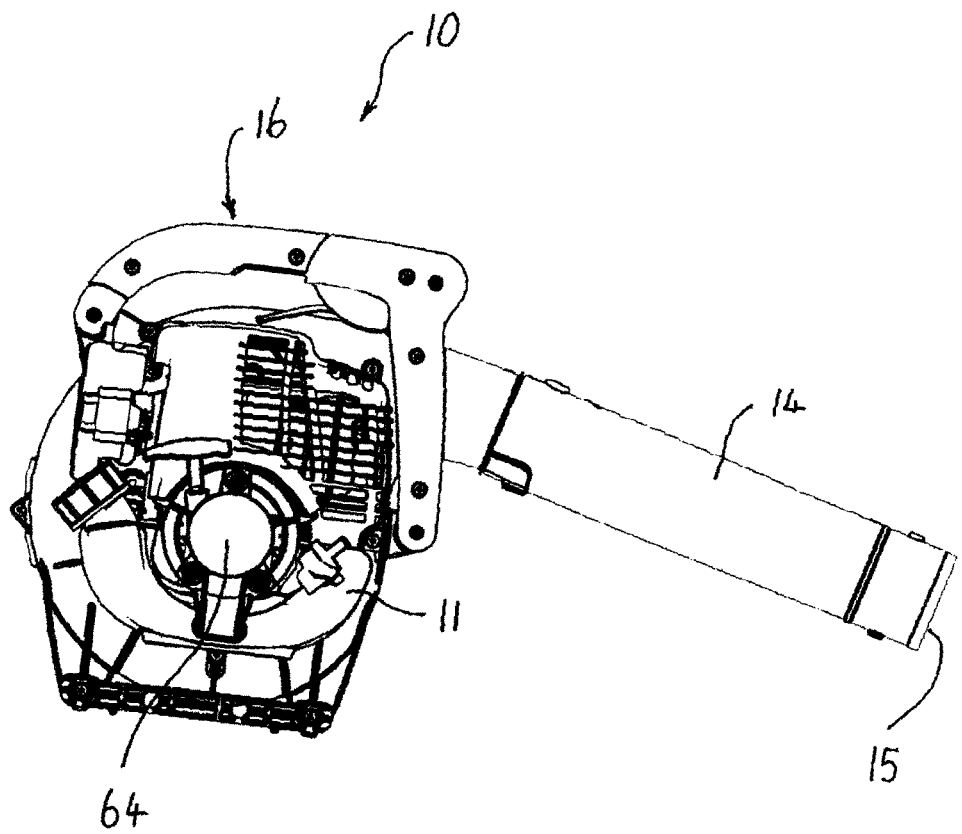
Figure 5:
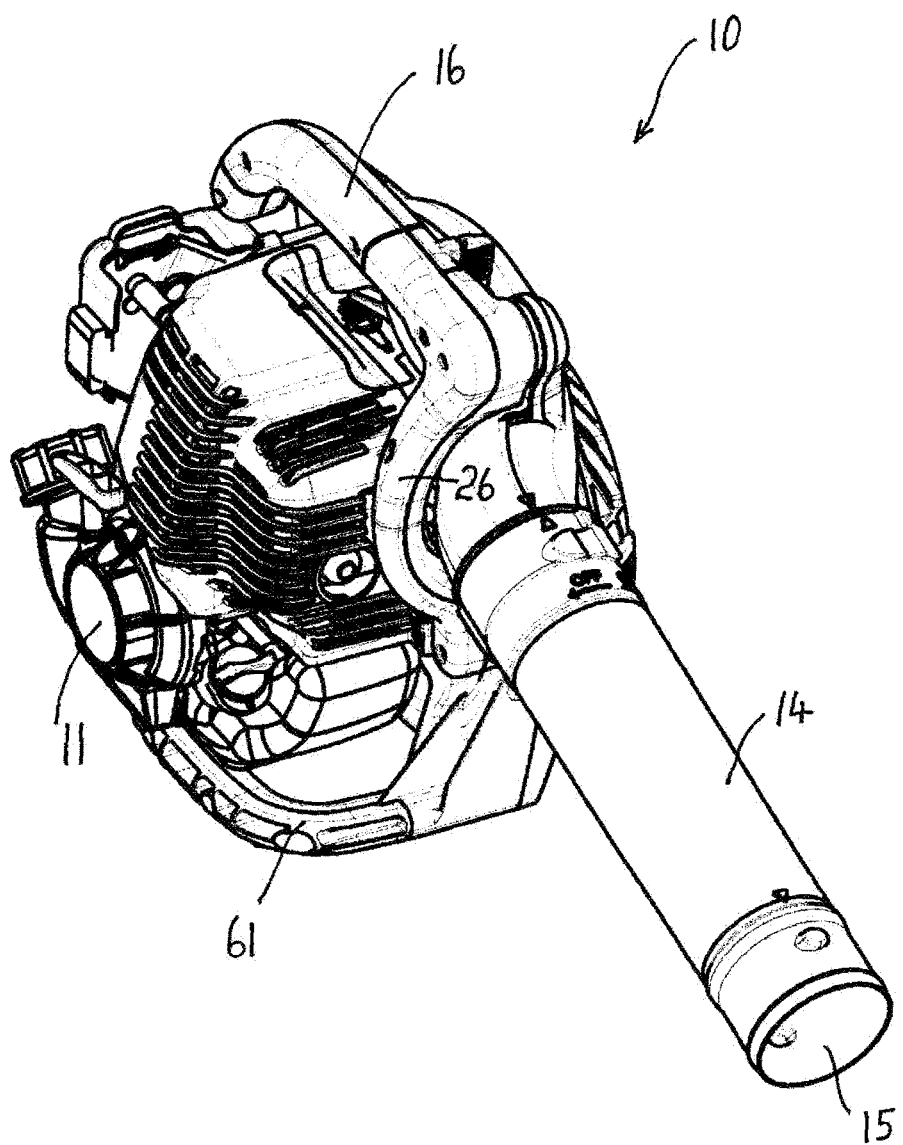
Figure 6:
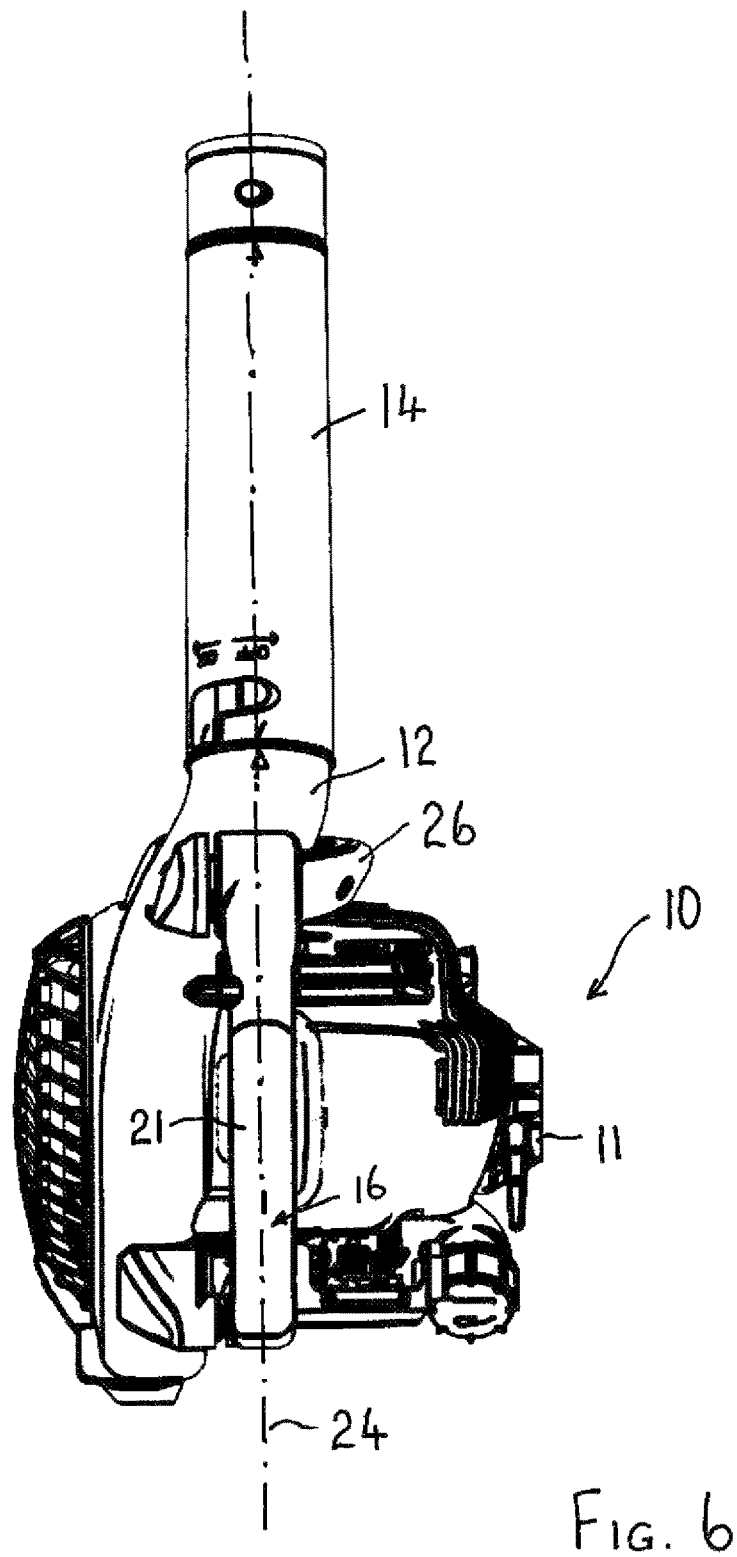
Figure 7:
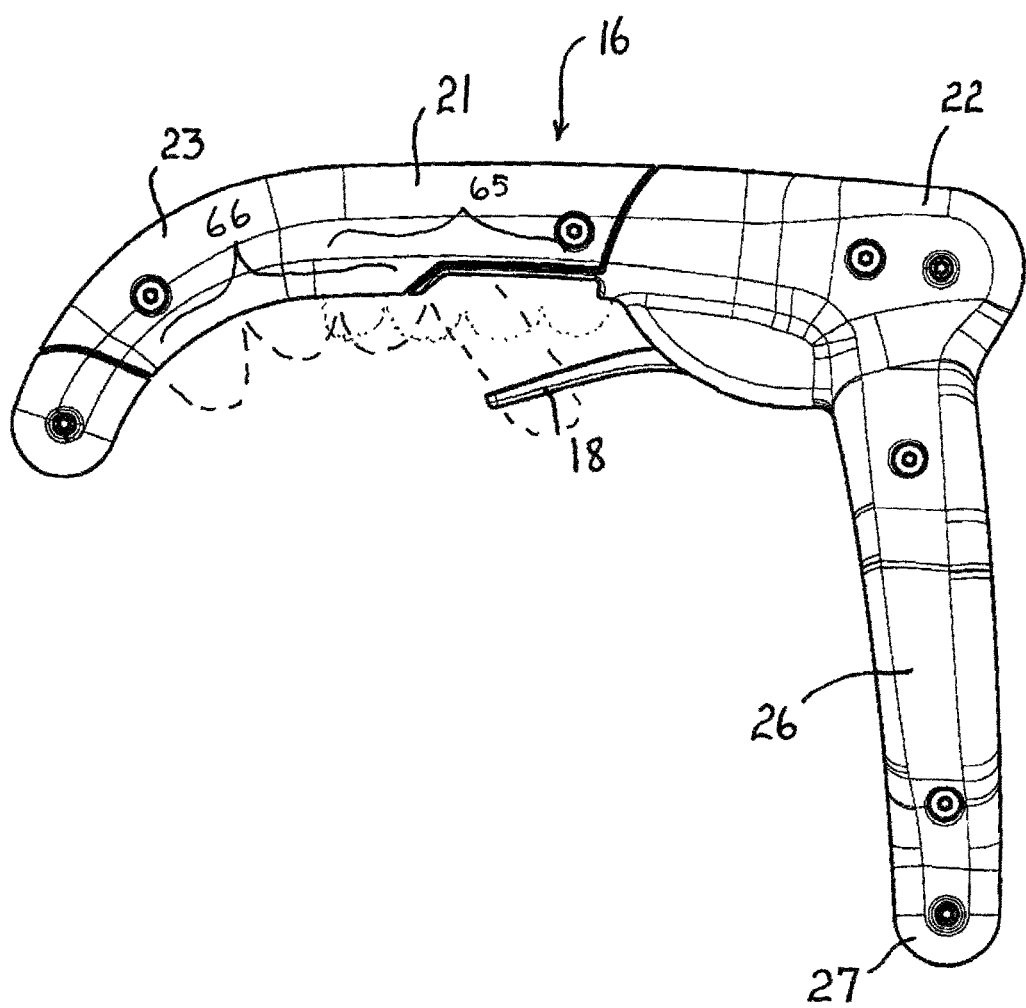
Figure 8:
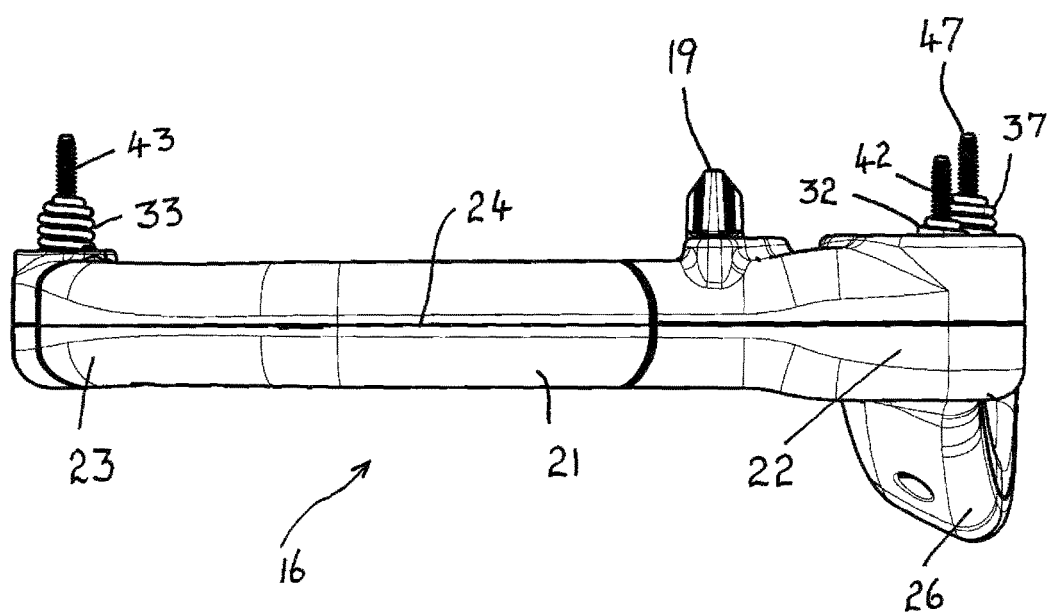
Figure 9:
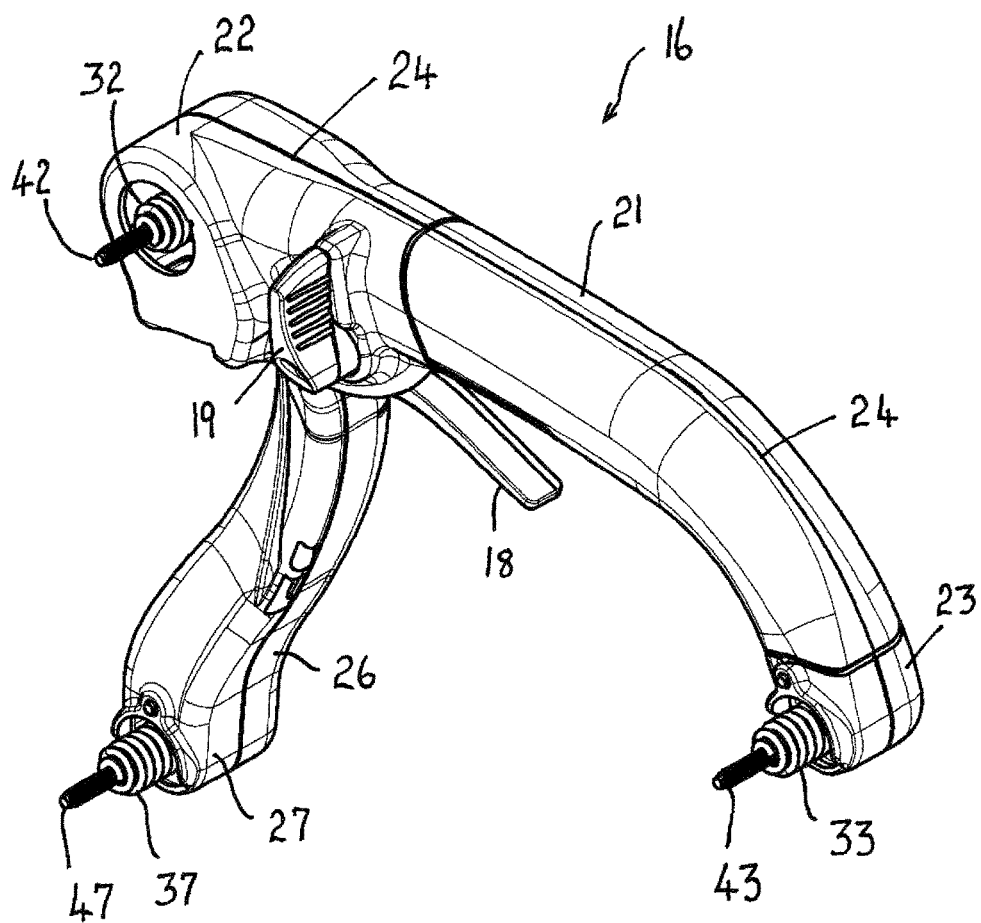
Figure 10:
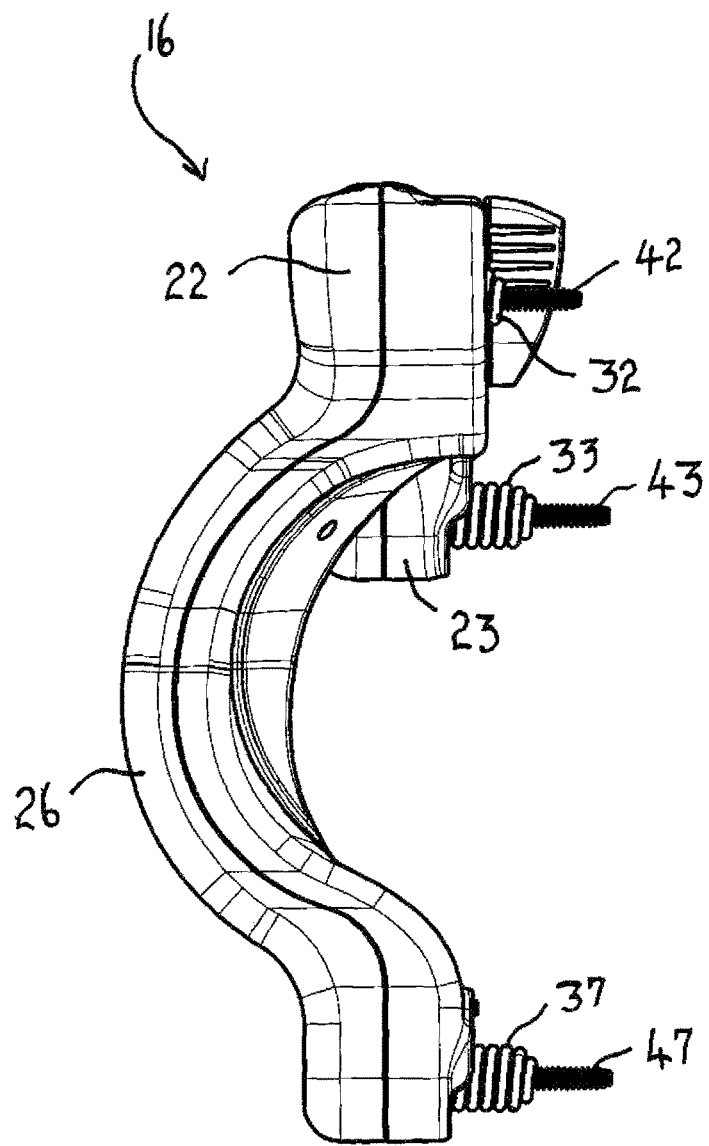
Figure 11:
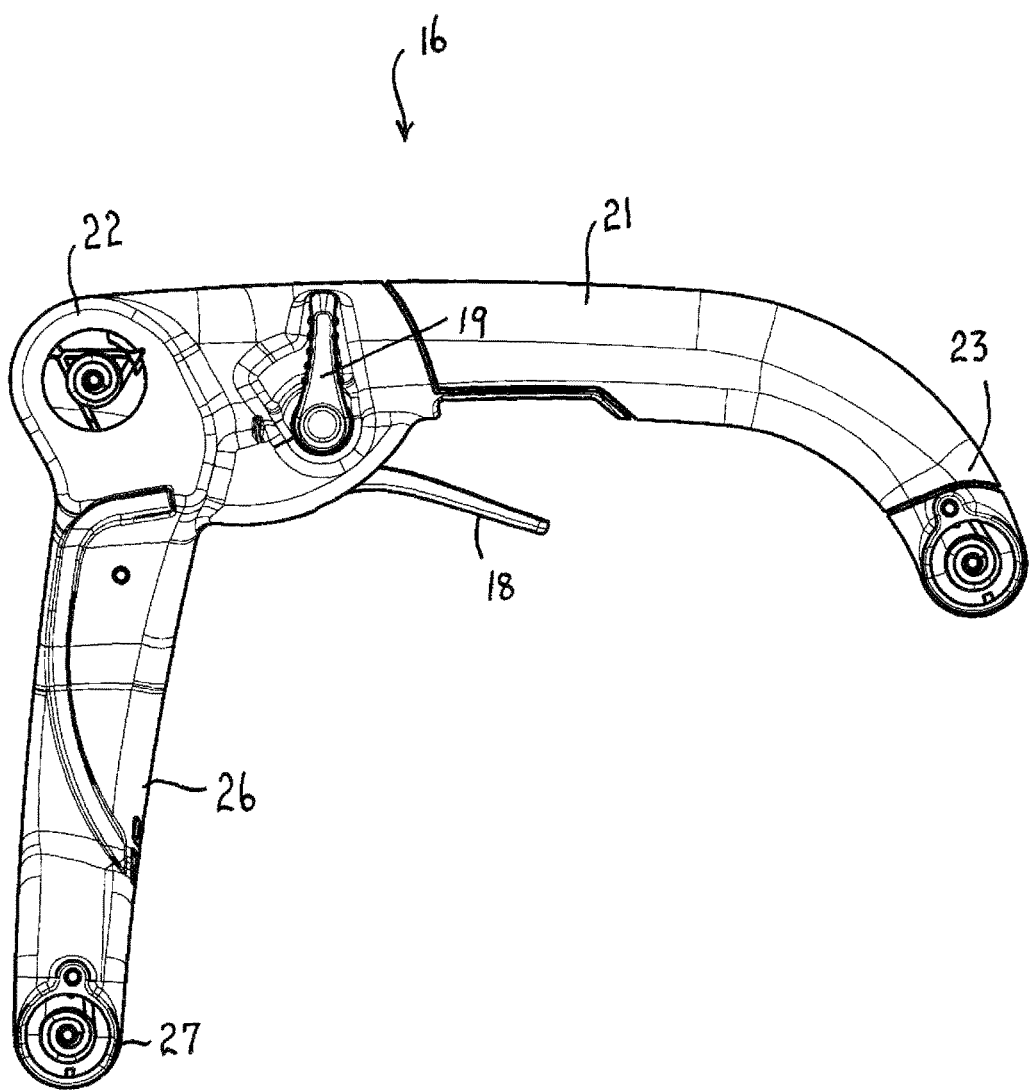
Figure 12:
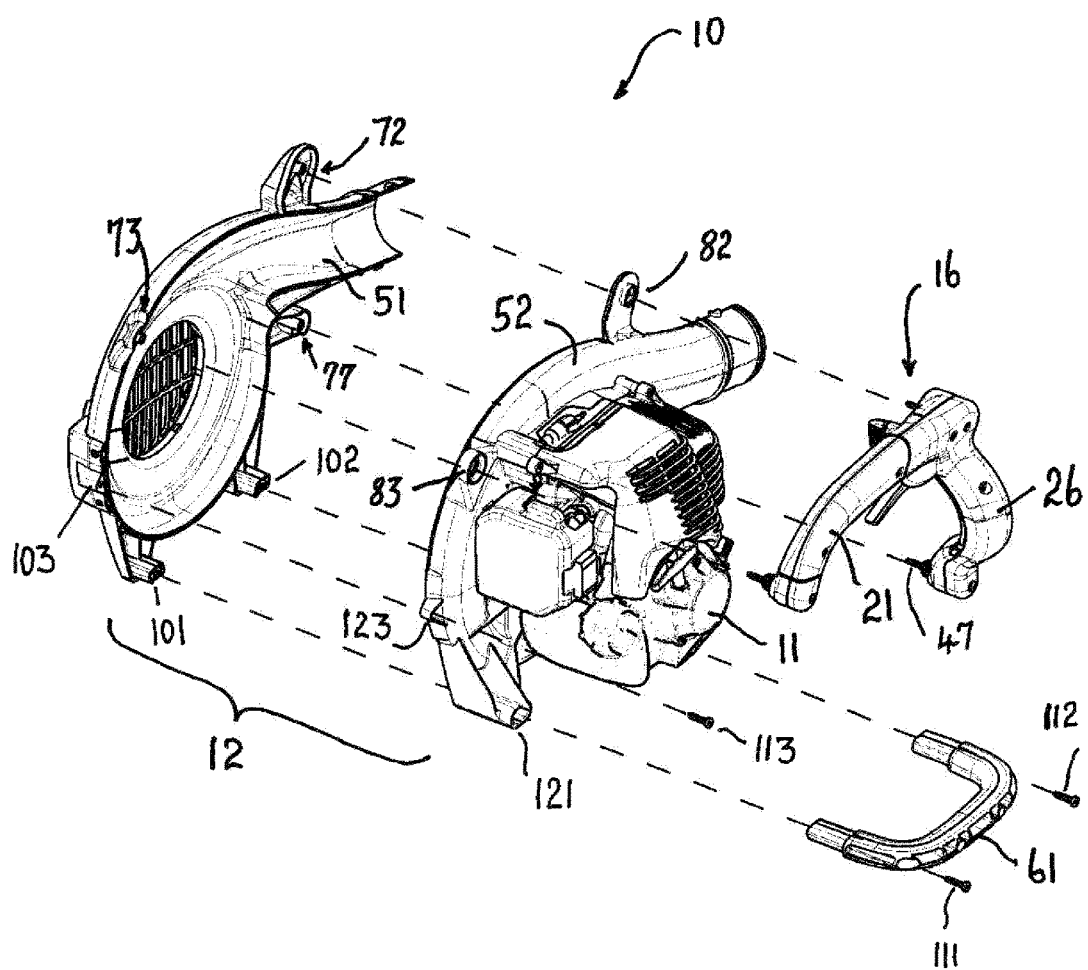
Figure 13:
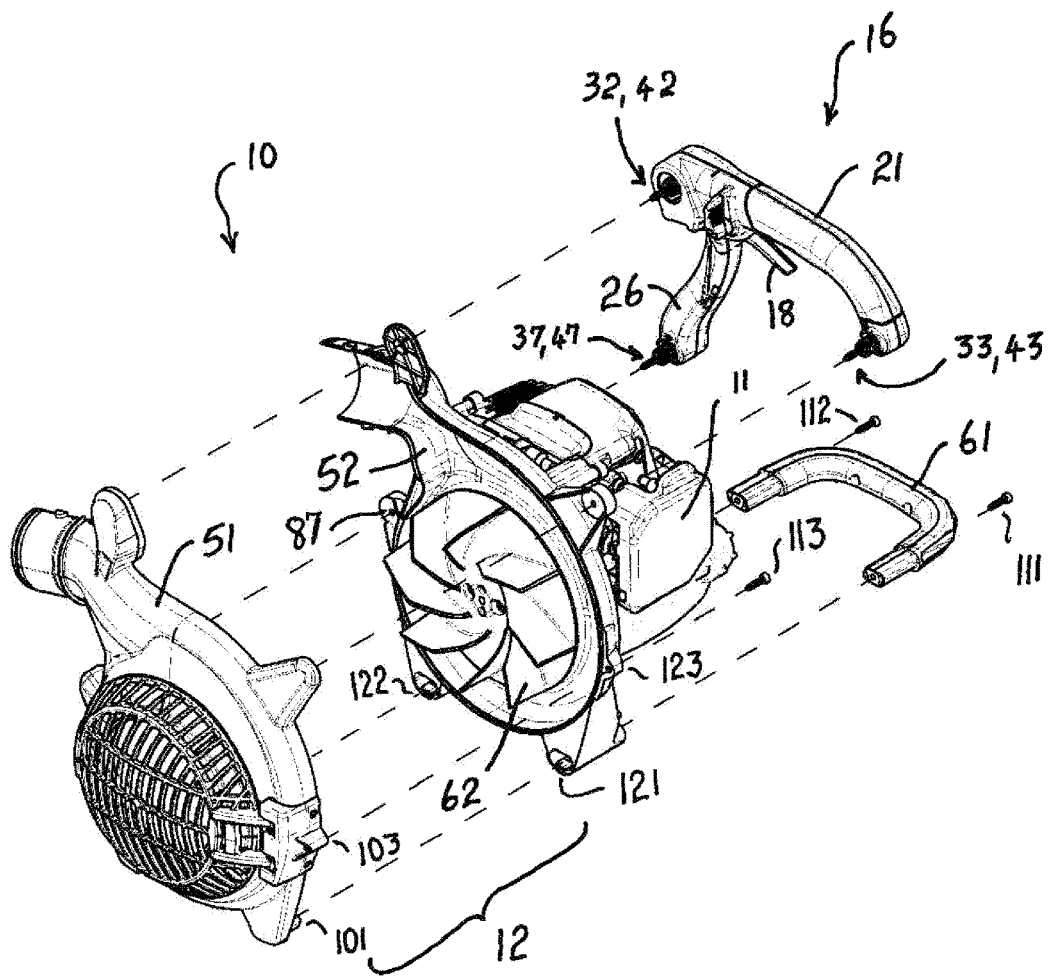
Figure 14:
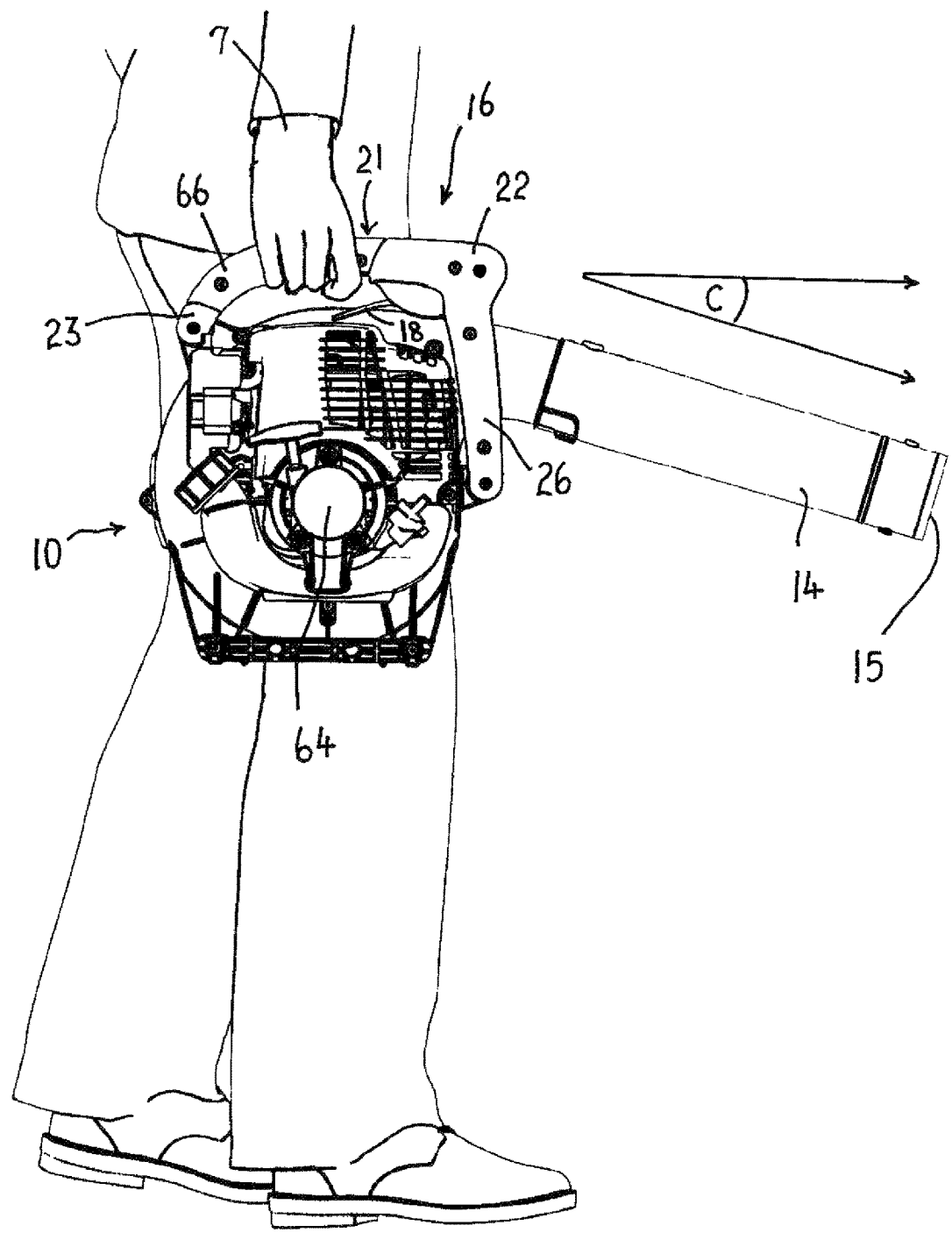
Figure 15:
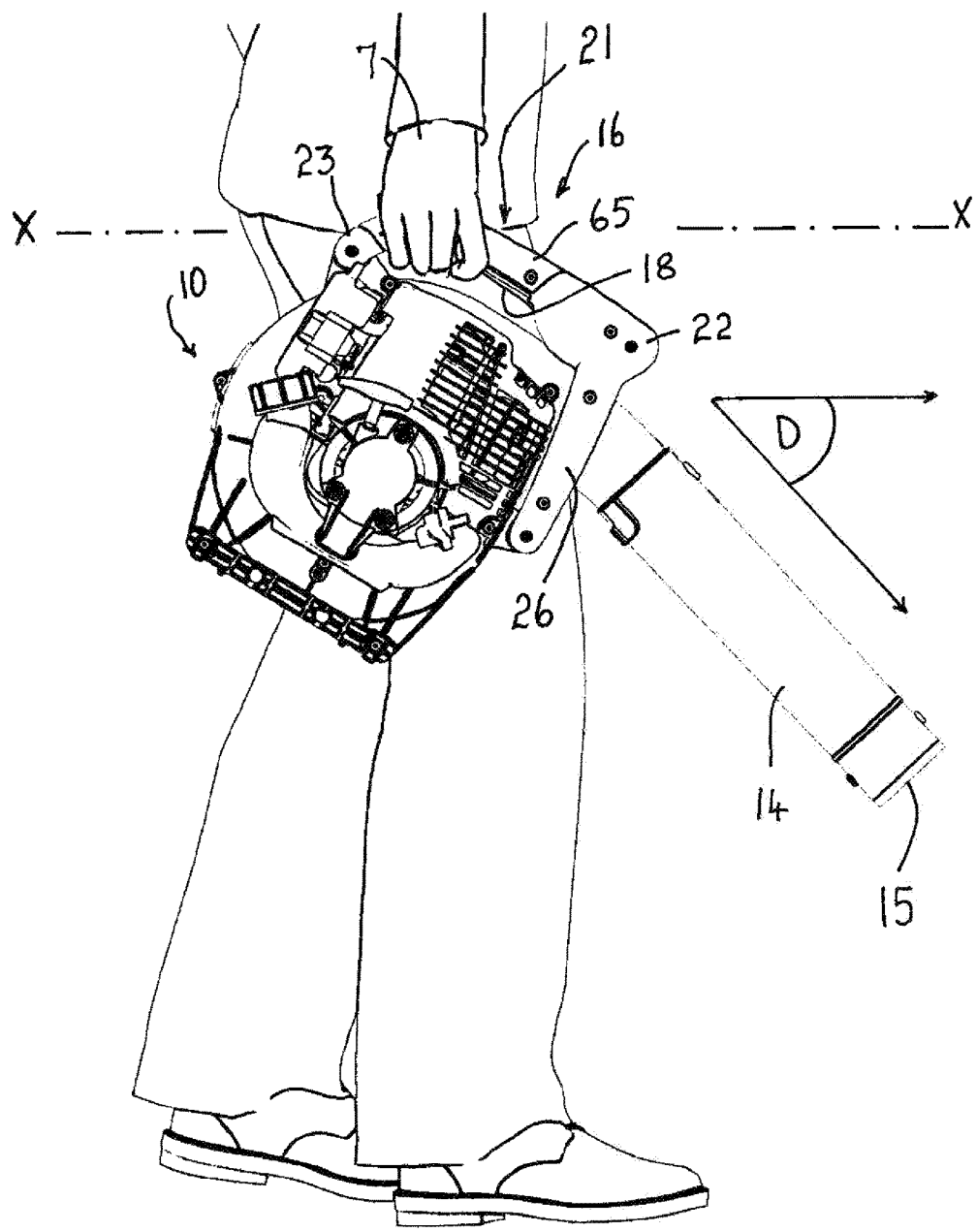
Figure 16:
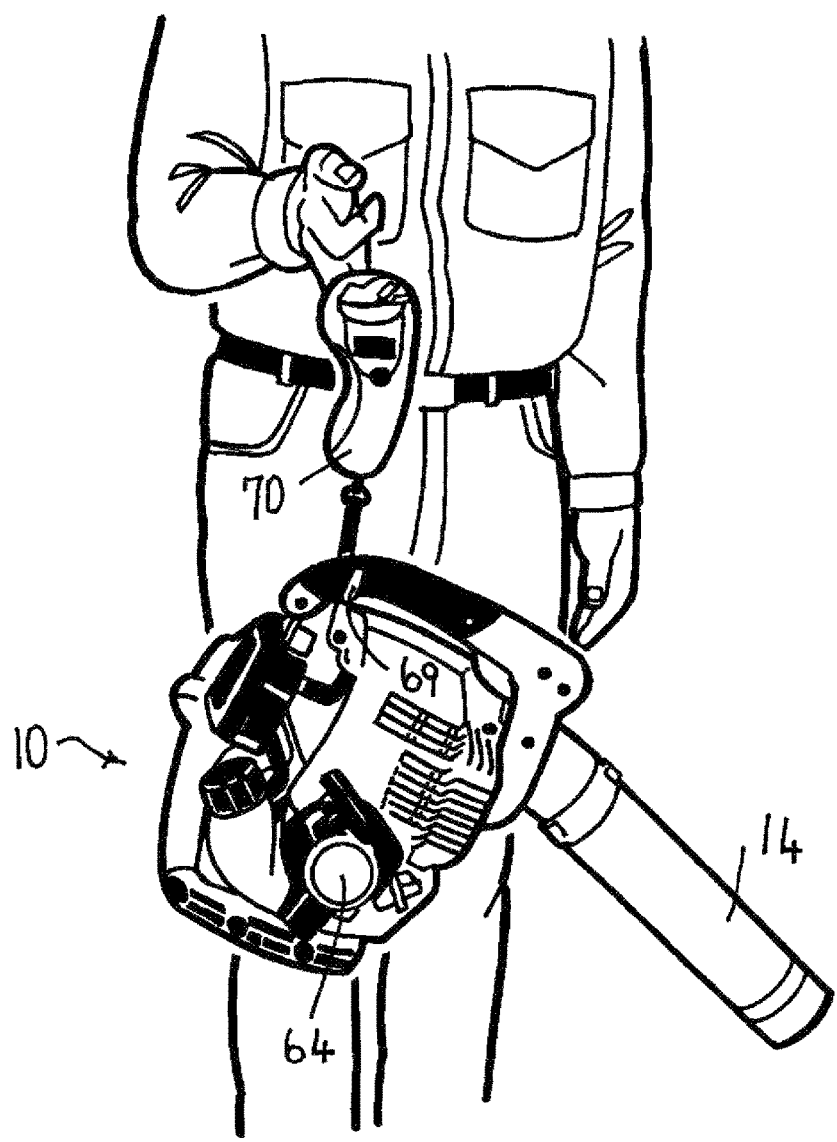

A preferred embodiment of the invention will now be described, by way of example only, with reference to the accompanying drawings in which:

FIG. 1 is a plan view of a conventional prior art blower,

FIG. 2 is a side elevation showing the blower of FIG. 1 being held in its transport position, FIG. 3 is a side elevation showing the blower of FIGS. 1 and 2 being held during operation or use, FIG. 4 is side elevation of a portable handheld motorised blower of the preferred embodiment having an L-shaped anti-vibration carry handle, FIG. 5 is a front perspective view of the blower of FIG. 4, FIG. 6 is a plan view of the blower of FIGS. 4 and 5, FIG. 7 is an enlarged side elevational view of the handle of the blower of FIG. 4, FIG. 8 is a plan view of the handle of FIG. 7, FIG. 9 is a perspective view of the handle of FIGS. 7 and 8, FIG. 10 is a front elevation of the handle of FIGS. 7-9, FIG. 11 is a side elevation of the handle of FIGS. 7-10 but showing the side opposite to that illustrated in FIG. 7, FIG. 12 is an exploded perspective view of the blower of FIG. 4 from the same side as that illustrated in FIG. 4, and FIG. 13 is an exploded perspective view of the blower of FIG. 4 from the opposite side to that illustrated in FIG. 12, FIG. 14 is a side elevation showing the blower of FIG. 4 in the transport position, FIG. 15 is a view similar to FIG. 3 but showing the blower of FIG. 4 in use, and FIG. 16 is a front perspective view of an operator weighing the blower of FIG. 4 by means of a suitcase weighing device, the blower of FIG. 4 operating and being in a stable equilibrium position during the weighing operation.

DETAILED DESCRIPTION

As seen in FIGS. 1-3, the blower 1 of the prior art has a handle 2, an engine 3, an air intake 4 and two air outlet tubes 5, 6. The handle 2 has a generally U or C-shaped configuration. It will be seen in particular from FIG. 1 that the air outlet tubes 5, 6 are aligned with the fan (not illustrated) which is located within the air intake 4. The outlet tubes 5, 6 lie in a plane which is substantially perpendicular to the axis of rotation of the fan. There is a misalignment between the air exit of the air outlet tubes 5, 6 and the longitudinal axis of the handle 2. This misalignment creates a rotational torque in use which tends to turn the blower 1 in an anticlockwise direction as seen in FIG. 1. This turning torque must be resisted by the hand and arm of the operator in use.

As seen in FIG. 2, when not in use the prior art blower 1 is able to be carried from place to place by means of the handle 2. In this transport position, the handle 2 is substantially level or horizontal. In this transport position, the handle 2 functions as the handle of a suitcase. That is to say, the operator's arm is substantially vertical, the operator's wrist 7 is not cocked, and the tube created by the operator's curled fingers is substantially horizontal to the ground. The air outlet tubes 5, 6 are directed downwardly below the horizontal by a dip angle A of approximately 15°. All prior art blowers incorporate two air outlet tubes 5, 6 and the dip angle A of approximately 15° arises because of the height of the blower and the combined length of the tubes. When the blower is resting on the ground, the air exit of the tubes is just above ground level. If the dip angle were any larger, the air exit of the tubes would strike the ground when the blower was resting on the ground.

The above-mentioned transport position is to be contrasted with the situation in use which is illustrated in FIG. 3. Here the wrist 7 of the operator is cocked so as to rotate the operator's hand 8 in a clockwise direction as indicated by arrow X in FIG. 3. This cocking action of the wrist 7 tilts the handle 2 downwardly so as to increase the dip angle B of the air outlet tubes 5, 6 to approximately 30°-40° below the horizontal.

In the configuration illustrated in FIG. 3, the blast of air exiting from the air outlet tubes 5, 6 is directed towards lawn cuttings, leaf litter and like debris which are intended to be blown across the surface of the ground. As a consequence, the operator must keep his wrist 7 cocked in the position illustrated in FIG. 3 whilst simultaneously resisting the torque generated by the misalignment of the outlet tubes 5, 6 and the handle 2, and also swinging the air outlet tubes 5, 6 from left to right and back again in a swinging arcuate motion. All these actions, plus the weight of the blower itself (which is typically 4-5 kgs depending upon the engine type and volume of fuel present), leads to considerable operator fatigue. This is especially the case in respect of professional tradesmen who use such blowers for long periods of time in their occupation.

Turning now to FIGS. 4 and 5, a portable handheld blower 10 of the preferred embodiment has an internal combustion engine 11 which is mounted to a housing 12 which forms the main component of the assembled blower. The blower 10 draws air into the housing 12 and expels the air at high speed through a tube 14 having an air exit opening 15 at its distal end. The blower 10 is held by the single hand of an operator by means of an L-shaped handle 16 which includes an elongate throttle lever 18 and a speed control selector 19 (FIG. 9).

It will be seen from FIG. 7 that the L-shaped handle 16 has a first U or C-shaped portion 21 having two ends 22, 23 and a longitudinal axis 24 (FIGS. 6 and 8). In addition, extending from the end 22 is an outrigger 26 having a free end 27. The first portion 21 and the outrigger 26 are preferably fabricated from two hollow generally L-shaped components each of which is substantially rigid, but can be made from two pieces, if desired, which are connected together to form the L-shape. The first portion 21 and the outrigger 26 are rigidly or firmly connected together if the first portion 21 is made from one piece and the outrigger 26 is made from another piece, or if parts 21, 26 are made from more than two pieces.

As best seen in FIG. 9, each of the ends 22, 23 and 27 is provided with a corresponding coiled metal spring 32, 33 and 37 which houses a corresponding screw or fastener 42, 43 and 47. The head of each of the fasteners is captive within the protruding end of the corresponding spring, and the shank of each fastener passes through the body of the appliance and forms one of the multiplicity of fasteners which maintains the two halves 51, 52 of the housing 12 clamped together around the fan or impeller 62 (FIG. 13) of the blower 10. For each of the springs 32, 33 and 37 the end of the spring which is located within the handle 16 is fastened to the handle 16. Consequently, the springs 32, 33 and 37 damp vibrations transmitted from the housing 12 to the handle 16.

If the outrigger 26 were absent, the first portion 21 would be able to rotate about its longitudinal axis 24 as a result of flexing of the springs 32, 33. However, the presence of the firmly fixed outrigger 26 inhibits this rotation since the smallest rotational movement of the first portion 21 is magnified at the free end 27 of the outrigger 26 and counteracted by means of the spring 37. As a result, this rotation of the first portion 21 about its longitudinal axis 24 is practically eliminated.

As best seen in FIG. 5, the outrigger 26 is curved so as to permit the housing 12 to have a curved outlet which connects to the tube 14. As best seen in FIG. 6, the air exit opening 15 of the tube 14 is co-planar with, (and thus effectively aligned with), the longitudinal axis of the U or C-shaped portion 21 of the L-shaped handle 16. In addition, the outrigger 26 is so closely spaced to the housing 12 that is it is not possible for human fingers to be placed between the two. Thus the outrigger 26 cannot function as a handle.

As best seen in FIGS. 12 and 13, the housing 12 is formed from two assemblies of pieces making up the parts 51, 52 which house the impeller 62. The housing 12 is also provided with a foot 61 to provide a stable base for the blower 10. The part 51 includes the air inlet and cowling for the impeller or fan 62 (FIG. 13). The part 52 has the engine 11 mounted thereon. Thus different engines (e.g. 2 stroke or 4 stroke or different engine capacities) can be easily mounted on the part 52 with little modification being required.

It will be apparent that the part 51 is provided with three blind threaded holes 72, 73 and 77 (FIG. 12) which receive the free ends of the fasteners 42, 43 and 47 respectively. The part 52 essentially becomes the "filling" of a sandwich in which the part 51 and the handle 16 are the "slices of bread". Thus the part 52 has clearance holes 82, 83 and 87 (obscured in FIG. 12 but illustrated in FIG. 13) through which the fasteners 42, 43 and 47 pass.

In addition, the assembly of pieces making up the housing part 51 is provided with three blind holes 101, 102, and 103 which respectively receive three fasteners 111, 112, and 113 which pass through corresponding clearance holes 121, 122 and 123. The fasteners 111 and 112 retain the foot 61 and the fastener 113 assists in clamping the housing part assemblies 51 and 52 together.

A particular advantage of the above construction is that the assembled housing part 51 as seen in FIG. 13 does not show any of the fasteners 42, 43, 47, 111, 112 and 113 and thus has an attractive appearance without any visible fasteners. In prior art arrangements the two parts 51 and 52 would be visibly screwed together and the handle 16 would be visibly fastened to the part 52, so an economy in the number of fasteners used is achieved, in addition to an attractive appearance.

Turning now to FIGS. 14 and 15 in particular, a still further advantage of the above described arrangement will now be described. In this connection it will be apparent that the handle 16 is required to support the blower in two distinct operational modes. The first such mode is when the blower is not operating and is simply being moved from one location, such as a shed, to another location such as a leaf covered lawn, where the blower is to be used. In these circumstances, it is desirable for the operator to experience a balanced load holding the handle 16 with one hand. This is achieved by the one hand holding the handle 16 above the centre of gravity of the blower.

As seen in FIG. 14, since the heaviest portion of the entire blower is the internal combustion engine, and the tube 14 is formed from lightweight plastics material, the centre of gravity of the blower 10 will be very close to a vertical line passing through the geometric centre 64 of the housing 12. As a consequence, the four fingers of the one hand of the operator holding the blower 10 are located in the position indicated by dotted lines in FIG. 7. In this condition, the hand of the operator is located at a first location 65. In particular, it will be seen that the speed control lever 18, or throttle control lever, is spaced from the first portion 21 by a distance more than the diameter of the operator's fingers. As a consequence, the first portion 21 is able to be grasped by the operator at the first location 65 when the blower is not operating. Since the first location 65 is substantially directly above the centre of gravity, which is close to a vertical line passing through the geometric centre 64, the operator with his hand at the first location 65 experiences a balanced load. That is, the blower does not tilt forwardly or rearwardly whilst being carried by a hand at location 65.

However, when the blower is operating, air is expelled from the tube 14. Particularly if the fan disclosed in Australian Patent Application No 2013 263 811 (to which U.S. patent application Ser. No. 14/095,154 corresponds) is installed within the housing 12, the volume of air which is expelled at high speed from the tube 14 is substantial and provides a significant thrust which tends to lift the blower 10. The exit 15 of the tube 14 is generally co-planar with the handle 16, even if the passage of the air from the fan to the tube exit 15 is curved so as to create a chicane as described in the abovementioned patent application. As a consequence of the above, and the alignment of the longitudinal axis 24 of the handle 16 and tube exit opening 15, the lift produced by the expelled air is generally in the plane of the handle 16.

In order to ease operator fatigue, the handle 16 has its first U or C-shaped portion 21 elongated in a direction away from the tube 14. As a consequence of this elongation, the operator can place the four fingers of the operating hand in the position illustrated by dashed lines in FIG. 7 at a second location 66 which is spaced from the first location 65 in a direction away from the tube 14.

That is, with the operator's hand grasping the first portion 21 of the handle 16 in the second location 66, the blower tends to rotate in a clockwise direction as seen in FIG. 4. The blower is in a stable equilibrium condition and the operator experiences a balanced load.

The throttle lever 18 is elongated as best seen in FIG. 7 to an extent sufficient to enable the index finger of the operator's hand to still reach the speed control lever 18, notwithstanding that the hand is in the second location 66 spaced away from the tube 14. In addition, the speed control selector 19 can be operated to fix the blower speed to any desired operating speed so it is not always necessary for the operator to have contact with the throttle lever 18 whilst the blower 10 is in use.

As seen in FIG. 14, whilst the blower 10 is held by the operator with the operator's hand holding the handle 16 in the first location 65, the blower is able to be easily transported from place to place with the centre of gravity of the blower 10 being located directly underneath the operator's hand. In this transport condition, the dip angle C of the tube 14 is approximately 15° below the horizontal. As with the prior art blower 1 of FIG. 2, in FIG. 14 the handle 21 and, in particular, the first portion 65 thereof, is substantially horizontal in this transport condition. The operator's wrist 7 is not cocked and the curled fingers of the operator form a tube which is substantially level as the operator is standing on substantially level ground.

However, in FIG. 15 the operator is holding the handle 16 at the second location 66 thereby lowering the tube 14 so that the dip angle D of the tube 14 is approximately 45° below the horizontal.

From a comparison of FIGS. 3 and 15, it will be seen that in FIG. 15 the second portion 66 of the handle 16 (which is gripped by the operator's single hand) is substantially level as indicated by the dot-dash line XX in FIG. 15. Furthermore, in FIG. 15 the operator's wrist 7 is not cocked, the operator's arm is substantially vertical, and the curled fingers of the operator's hand form a tube which is substantially horizontal as indicated by the line XX. That is, the second portion 66 is functioning as a conventional U or C-shaped suitcase handle. As a consequence, the operator's hand is in a natural and relaxed position which will not fatigue the operator.

As illustrated in FIG. 16, the blower 10, whilst operating, can be suspended from the second portion 66 of the handle 16 by a swivel hook 69 of a suitcase scale 70 conventionally used to weigh suitcases to ensure that airline travellers comply with weight limits stipulated by aircraft operators.

During the abovementioned weighing procedure, with the hook 69 centrally located on the second location 66 in the position of the fingers illustrated in dashed lines in FIG. 7 (which thereby mimics the position of the operator's hand in FIG. 15) the operating blower remains stably supported by the swivel hook 69 and maintains a substantially constant position. This result clearly demonstrates two things. Firstly, that the air exit opening 15 of the tube 14 is aligned with the longitudinal axis 24 of the handle 16 and so no torque about a generally vertical axis through the blower 10 is created. As a result, there is no twisting motion to be counteracted by the operator in use.

In addition, there is an upwards force on the handle 16 generated by the thrust of the air expelled from the air exit 15. The result is a stable equilibrium condition of the forces acting on the blower 10 which means that there is no force, or torque, required to be counteracted by the operator which leads to reduced fatigue.

Furthermore, and most importantly, during use the weight of the blower 10 experienced by the operator as measured by the scale 70 is reduced because of the thrust generated by the air exiting from the tube 14. The weight recorded at sea level on the scale 70 with the blower 10 operating, is approximately 3.6 kg compared with a weight registered on the scale 70 of 4.6 kg if the blower 10 is not operating. This is a weight reduction of approximately 22%. The engine 11 was a four stroke engine in both instances. Alternatively, if the engine 11 is a two stroke engine, then the scale 70 records a weight of approximately 4.2-4.3 kg if the blower 10 is not operating and a weight of approximately 3.2-3.3 kg when the blower 10 is operating. The weight reduction of the blower 10 in use is dependent upon the height above sea level of the operator. The inventors have measured that at sea level the weight reduction of the blower 10 experienced by the operator as recorded by the scale 70 with the blower 10 operating is approximately 1.0 kg at sea level, is approximately 0.9 kg at approximately 1000 meters above sea level, and is approximately 0.8 kg at approximately 2000 meters above sea level. This change is brought about by the reduction in the density of the air exiting the tube 14 at higher elevations. The weight reduction also varies slightly at a given altitude upon variations in atmospheric pressure.

The foregoing describes only one embodiment of the present invention and modifications, obvious to those skilled in small engine appliance manufacturing, can be made thereto without departing from the scope of the present invention. For example, the dip angle of the single tube 14 of the blower 10 can be increased to approximately 30° because of the short length of the air exit tube 14 compared to the combined length of the two tubes 5,6 of the prior art devices.

The term "comprising" (and its grammatical variations) as used herein is used in the inclusive sense of "including" or "having" and not in the exclusive sense of "consisting only of".

The invention claimed is:

1. An anti-vibration handle for a hand-held appliance having a motor or engine which induces vibration, a blower powered by said motor or engine, said blower being connected with an air exit tube, and a body to which said the motor or engine is mounted; said handle comprising a first elongate portion and a second outrigger portion; said first elongate portion having two ends, having a longitudinal axis extending between said two ends, being shaped to be grasped by one hand of an operator between said ends; and said second outrigger portion being located adjacent one of said ends, extending generally perpendicularly to said longitudinal axis from said first elongate portion, terminating in a distal end, and being firmly connected with said first elongate portion; said two ends and said distal end each having a corresponding one of three coil springs by means of which said ends can be attached to the body of said appliance, and said outrigger portion being closely spaced from said body so as to not function as a graspable handle portion, whereby said outrigger portion restrains said first portion from rotating about its longitudinal axis due to flexing of the two springs connected to said two ends.

2. The handle as claimed in claim 1 wherein said first elongate portion includes a throttle trigger or similar speed control device.

3. The handle as claimed in claim 1 wherein each of said coil springs includes a fastener having a head captive within the spring and a shaft extending from the spring.

4. The handle as claimed in claim 3 wherein said body includes a housing fabricated as two components and each said fastener with a captive head extends from said handle, passes through one of said housing components, into the other of said housing components, and clamps said housing components together.

5. The handle arrangement as claimed in claim 1 and having a trigger lever to operate a throttle or speed control for said blower, wherein said trigger lever is pivoted from that end of said handle portion adjacent said tube and extends away from said tube.

6. The handle arrangement as claimed in claim 5 wherein said trigger lever is spaced from said handle portion.

7. The handle arrangement as claimed in claim 6 will wherein said trigger lever is elongated and extends away from said tube.

\* \* \* \* \*